United States Patent Office 3,150,143
Patented Sept. 22, 1964

3,150,143
THERAPEUTICALLY ACTIVE N-SUBSTITUTED AZASPIRANES
Charles H. Grogan, Falls Church, Va., and Leonard M. Rice, Baltimore, Md., assignors to The Geschickter Fund for Medical Research, Washington, D.C., a corporation of New York
No Drawing. Filed July 19, 1960, Ser. No. 43,747
9 Claims. (Cl. 260—293)

This invention relates to novel synthetic organic compounds having significant chemotherapeutic utility and to methods for their paration. More particularly, this invention relates to novel azaspiranes, their simple acid addition and quaternary salts, and to methods for their preparation.

The several inventions of the present application have a number of significant objects. A primary object of these inventions is to provide novel, physiologically active organic compounds and methods for their preparation, said compounds being characterized by their chemotherapeutic or medicinal properties and particularly by their pharmacological activity on the nervous and cardiovascular systems.

It is another principal object of the present inventions to provide novel azaspiranes having the chemotherapeutic activity recited above, their ring- and N-substituted derivatives, the simple acid addition and quaternary salts thereof, and methods for their preparation.

These and other objects of the several inventions presented in the instant application will become more apparent as the description proceeds below.

Generally speaking, the intermediate compounds for preparing the novel compounds of the present inventions are obtained by reacting an appropriate alkyl or alkoxyalkyl primary amine with the anhydrides of carbocyclic gemdiacetic or gem-carboxy acetic acid and heating sufficiently to cyclize the amic acid thus formed to the imide or azadione. A cyclizing temperature of approximately 140°–220° C. is acceptable, with a temperature range of 180°–200° C. being preferred.

The novel azaspiranes of the instant inventions may be prepared by reducing the imides prepared as above by suitable means to obtain N-alkyl or N-alkoxyalkyl azaspirane bases. The latter may then be converted by appropriate means into their simple acid addition and quaternary salts.

Formula 1 illustrates the general structural formula of the azaspirane-dione intermediates of the present invention:

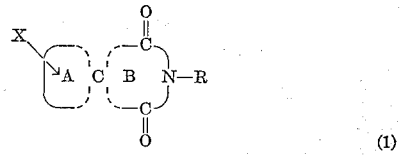

(1)

In this formula, the azaspirane-dione structure consists of five essential elements: (a) the ring A; (b) the ring B; (c) the spiro carbon atom connecting rings A and B; (d) the substituent X on ring A; and (e) the substituent R on ring B.

Ring A of the basic azaspirane-dione structure shown above comprises a hydrocarbon ring, mono- or bicyclic, of at least 5 carbon atoms. While there is no particular limit on the number of carbon atoms in ring A, a ring of from 5 to 15 carbon atoms is preferred. Ring B of this structure comprises a saturated heterocyclic ring containing 5 or 6 atoms, one of which is nitrogen, the nitrogen atom being at least one carbon atom removed from the spiro carbon atom joining rings A and B, the carbons alpha, alpha' to the nitrogen atom being carbonyl carbons. As above stated, element (c) of the basic structure is the spiro carbon atom, from which the name "spiro" is derived, connecting rings A and B. Element (d), namely substituent X on ring A, represents one or more atoms and/or radicals of the group consisting of hydrogen, alkyl and alkoxy, or any combination of these. Element (e) of the basic structure, the R substituent, represents either an alkyl or alkoxyalkyl group of from 1 to 22 carbon atoms.

Formula 2 illustrates the general structural formula of the novel azaspiranes of the instant invention:

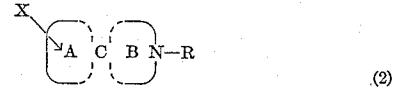

(2)

As in the case of the azaspirane-diones, the azaspirane structure shown above consists of five essential elements: (a) ring A; (b) ring B (c) the spiro carbon atom connecting rings A and B; (d) substituent X on ring A; and (e) the N-substituted radical R. Except for element (b), namely ring B, Formula 2 is identical to Formula 1. Ring B of the basic azaspirane structure illustrated in Formula 2 comprises a saturated heterocyclic ring containing 5 or 6 atoms, one of which is nitrogen, the nitrogen atom being at least one carbon atom removed from the spiro carbon atom joining rings A and B.

In addition to the azaspiranes set forth above in Formula 2, the instant invention additionally contemplates the treatment of the basic azaspiranes of Formula 2 to form simple acid addition and quaternary salts. Formulas 3 and 4 illustrate the type and site of salt formation resulting from the appropriate treatment of the azaspirane bases of the present invention.

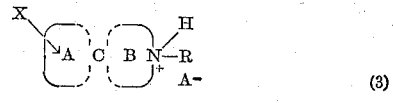

(3)

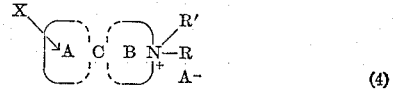

(4)

Formula 3 illustrates the simple salt formation resulting from the salting of the tertiary amine nitrogen of ring B of the basic azaspirane with non-toxic acid anions, such as chloride, iodide, bromide, sulfate, acetate, succinate, maleate, phosphate, benzoate, lactate, thiodisalicylate, mucate, citrate, tartrate and the like. In general, those non-toxic salts of the basic azaspiranes which are soluble in water or other well-tolerated solvents are particularly useful for therapeutic purposes due to the ease of administration of the salts in their dissolved form. In addition, other non-toxic salts may also be used.

Formula 4 illustrates quaternary salt formation resulting from quaternizing the ring nitrogen of ring B of the basic azaspiranes with alkyl esters. As illustrated in Formula 4, R' represents an alkyl or alkoxyalkyl radical of from 1 to 22 carbon atoms. R and R' may, of course, be the same or different radicals as the case may be. The anion, A⁻, may be any of the non-toxic anions useful in forming the simple acid addition salts as discussed above in connection with Formula 3.

The free bases and their non-toxic simple acid addition salts have profound effects on the nervous system. Depending upon the size and nature of rings A and B as well as the size of the side chain, excitants or depressants of the nervous system may be formulated. The quaternary salts of the basic azaspiranes of the present invention also have significant effects on the nervous system.

To produce apprehensive states in rabbits, doses of from 5–10 mg./kilo of the quaternary salt may be administered I.P. or I.V. The bases or the base hydrochlorides, when administered to animals such as rabbits or rats, provide excellent protection against convulsions induced by the convulsant agent Metrazol.

The following examples will serve to illustrate the novel procedures by which the azaspirane-diones, the basic azaspiranes and the simple and quaternary salts of the latter are formulated:

*Example 1*

(a) N-methyl-3-azaspiro (5:5) undecane-2,4-dione: Forty g. of the anhydride of cyclohexane-1,1-diacetic acid was placed into a 300 ml. round-bottom flask. A 25% aqueous solution of methylamine (30 g.) was added until a clear homogeneous mixture was obtained. The anhydride dissolved from the heat generated by the reaction. The reaction mixture was heated in an oil bath until all water had been boiled off. The temperature was gradually increased to 180–200° at which temperature it was maintained for two hours. The reaction mixture was allowed to cool and was then distilled in vacuo to yield the N-methyl imide of cyclohexane-1,1-diacetic acid anhydride boiling at 133–135° at 1.5 mm. The product solidified and melted at 71–72°. On recrystallization from ether it melted at 72–73°.

(b) N-methyl-3-azaspiro (5:5) undecane: The title base was prepared by reduction of the imide prepared in (a) above. Fifteen grams of lithium aluminum hydride and one liter of anhydrous ether were placed in a 2-liter, 3-necked reaction flask, equipped with stirrer, dropping funnel, reflux condenser and protected from atmospheric moisture with a soda-lime tube. The finely powdered LAH was stirred with the ether until dissolved. A solution of 20 g. of the imide synthesized in (a) above dissolved in 300 ml. of anhydrous ether was added dropwise over a period of 15 minutes. The mixture was stirred for 3 hours and then decomposed by the slow dropwise addition of water. When hydrogen had ceased to be evolved, a slight excess of water was added and the mixture stirred for ½ hour. The inorganic solids were filtered off and the solid residue washed with several portions of ether. The ethereal solution was dried over anhydrous sodium sulfate, the ether stripped and the residual base distilled in vacuo to yield the title base boiling at 96–97° at 10 mm.

(c) The methiodide of the base was prepared by treating a solution of the base in isopropyl alcohol with a 10% excess of methyl iodide. After standing overnight, the crystalline material which had separated was filtered off and melted at 284–285°. Recrystallization from alcohol did not change the melting point.

(d) The hydrochloride of the base was prepared by treating a solution of the base in isopropyl alcohol with an excess of a saturated solution of hydrogen chloride in ethanol. It melted at 249–250° and on recrystallization from alcohol-ether melted at 251–252°.

*Example 2*

(a) N-methyl-8-azaspiro (4:5) decane-7,9-dione: The imide was prepared, using the general procedure employed in Example 1, from the anhydride of cyclopentane-1,1-diacetic acid and an excess of methylamine. The product had a B.P. of 114–116° at 0.9 mm. and a M.P. of 56–57°.

(b) N-methyl-8-azaspiro (4:5) decane: The title base was prepared by reduction of the imide obtained in (a) above, utilizing the general procedure employed in Example 1. The product had a B.P. of 78–79° at 11 mm.

(c) The methiodide was prepared as in Example 1 and had a M.P. of 272–273°.

(d) The hydrochloride was prepared as in Example 1 and had a M.P. of 217–218°.

*Example 3*

(a) N-methyl-2-azaspiro (4:4) nonane-1,3-dione: The imide was prepared, using the general procedure employed in Example 1, from the anhydride of cyclopentane-1-carboxy-1-acetic acid and an excess of methylamine. The product had a B.P. of 95–96° at 1.2 mm. and an M.P. of 46–47°.

(b) N-methyl-2-azaspiro (4:4) nonane: The title base was prepared by reduction of the imide obtained in (a) above, using the general procedure employed in Example 1, and had a B.P. of 174–176° at 760 mm.

(c) The methiodide was prepared as in Example 1 and had an M.P. of 219–220°.

(d) The hydrochloride was prepared as in Example 1 and had an M.P. of 135–136°.

*Example 4*

(a) N-methyl-2-azaspiro (4:5) decane-1,3-dione: The imide was prepared, as in Example 1, from the anhydride of cyclohexane-1-carboxy-1-acetic acid and methylamine and had a B.P. of 105–106° at 0.75 mm.

(b) N-methyl-2-azaspiro (4:5) decane: The title base was prepared as in Example 1 by reduction of the imide obtained in (a) above and had a B.P. of 64–68° at 9 mm.

(c) The methiodide was prepared as in Example 1 and had an M.P. of 241–242°.

(d) The hydrochloride was prepared as in Example 1 and had an M.P. of 186–187°.

*Example 5*

(a) N-methyl-2-azaspiro (4:6) undecane-1,3-dione: The imide was prepared as in Example 1 from the anhydride of cycloheptane-1-carboxy-1-acetic acid and an excess of methylamine and had a B.P. of 115–120° at 0.2 mm. and an M.P. of 27–28°.

(b) N-methyl-2-azaspiro (4:6) undecane: The imide was reduced to the title base as in Example 1 and had a B.P. of 88–90° at 9 mm.

(c) The methiodide was prepared as in Example 1, and had an M.P. of 266–267°.

(d) The hydrochloride was prepared as in Example 1 and had an M.P. of 202–203°.

*Example 6*

(a) N-methyl-3-azaspiro (5:6) dodecane-2,4-dione: The imide was prepared as in Example 1 from the anhydride of cycloheptane-1,1-diacetic acid and an excess of methylamine and had a B.P. of 128–131° at 0.6 mm. and an M.P. of 51–52°.

(b) N-methyl-3-azaspiro (5:6) dodecane: The title base was obtained as in Example 1 by reduction of the imide obtained in (a) above and had a B.P. of 109–111° at 10 mm.

(c) The methiodide was prepared as in Example 1 and had an M.P. of 300–301°.

(d) The hydrochloride was prepared as in Example 1 and had an M.P. of 250°–251°.

*Example 7*

(a) N-butyl-2-azaspiro (4:5) decane-1,3-dione: The imide was prepared as in Example 1 from the anhydride of cyclohexane-1-carboxy-1-acetic acid and a slight excess of n-butylamine and had a B.P. of 131–133° at 1.3 mm.

(b) N-butyl-2-azaspiro (4:5) decane: The title base was prepared as in Example 1 by reduction of the imide obtained in (a) above and had a B.P. of 110–111° at 12 mm.

(c) The methiodide was prepared as in Example 1 and had an M.P. of 114–115°.

(d) The hydrochloride was prepared as in Example 1 and had an M.P. of 235–236°.

*Example 8*

(a) N-hexyl-2-azaspiro (4:5) decane-1,3-dione: The imide was prepared as in Example 1 from the anhydride of cyclohexane-1-carboxy-1-acetic acid and a slight excess of n-hexylamine and had a B.P. of 107–116° at 0.025 mm.

(b) N-hexyl-2-azaspiro (4:5) decane: The title base was prepared as in Example 1 by reduction of the imide obtained in (a) above and had a B.P. of 135–138° at 10 mm.

(c) The hydrochloride was prepared as in Example 1 and had an M.P. of 235–236°.

(d) The methiodide was prepared as in Example 1, and had an M.P. of 130–131°.

Example 9

(a) N-dodecyl-2-azaspiro (4:5) decane-1,3-dione: The imide was prepared as in Example 1 from the anhydride of cyclohexane-1-carboxy-1-acetic acid and a slight excess of n-dodecylamine and had a B.P. of 168–173° at 0.025 mm.

(b) N-dodecyl-2-azaspiro (4:5) decane: The title base was prepared as in Example 1 by reduction of the imide obtained in (a) above and had a B.P. of 154–158° at 0.45 mm.

(c) The methiodide was prepared as in Example 1 and had an M.P. of 198–199°.

(d) The hydrochloride was prepared as in Example 1 and had an M.P. of 209–210°.

Example 10

(a) N-methyl-2-methyl-8-azaspiro (4:5) decane-7,9-dione: The imide was prepared as in Example 1 from the anhydride of 3-methylcyclopentane-1,1-diacetic acid and an excess of methylamine and had a B.P. of 86–89° at 0.15 mm.

(b) N-methyl-2-methyl-8-azaspiro (4:5) decane: The title base was obtained as in Example 1 by reduction of the imide obtained in (a) above and had a B.P. of 57–59° at 1 mm.

(c) The methiodide was prepared as in Example 1 and had an M.P. of 283–284°.

(d) The hydrochloride was prepared as in Example 1 and had an M.P. of 221–222°.

Example 11

(a) N-methyl-8-methyl-3-azaspiro (5:5) undecane-2,4 dione: The imide was prepared as in Example 1 from 3-methylcyclohexane-1,1-diacetic acid anhydride and an excess of methylamine and had a B.P. of 95–97° at 0.8 mm. and an M.P. of 71–72°.

(b) N-methyl-8-methyl-3-azaspiro (5:5) undecane: The title base was obtained as in Example 1 by reduction of the imide obtained in (a) above and had a B.P. of 73–74° at 0.8 mm.

(c) The methiodide was prepared as in Example 1 and had an M.P. of 289–290°.

(d) The hydrochloride was prepared as in Example 1 and had an M.P. of 236–237°.

Example 12

(a) N-methyl-7-methyl-2-azaspiro (4:5) decane-1,3-dione: The imide was prepared as in Example 1 from the anhydride of 3-methylcyclohexane-1-carboxy-1-acetic acid and an excess of methylamine and had a B.P. of 80–83° at 0.2 mm.

(b) N-methyl-7-methyl-2-azaspiro (4:5) decane: The title base was obtained as in Example 1 by reduction of the imide obtained in (a) above and had a B.P. of 49–50° at 0.6 mm.

(c) The methiodide was prepared as in Example 1 and had an M.P. of 258–259°.

(d) The hydrochloride was prepared as in Example 1 and had an M.P. of 174–175°.

Example 13

(a) N-methyl-9-methyl-3-azaspiro (5:5) undecane-2,4-dione: The imide was prepared as in Example 1 from the anhydride of 4-methylcyclohexane-1,1-diacetic acid and an excess of methylamine and had an M.P. of 102–103°.

(b) N-methyl-9-methyl-3-azaspiro (5:5) undecane: The title base was obtained as in Example 1 by reduction of the imide obtained in (a) above and had a B.P. of 80–82° at 1.2 mm.

(c) Various quaternary salts of the title base were prepared as follows:

(1) The methiodide was prepared as in Example 1 and had an M.P. of 308–309°.

(2) The methochloride was prepared by liberating the free base from the methiodide by shaking a saturated aqueous solution of the methiodide with a fine aqueous suspension of silver oxide, filtering off the silver oxide-silver iodide nad neutralizing the resultant strongly alkaline solution of the base with a saturated hydrogen chloride solution in ethanol. The solution was evaporated to dryness in a rotary evaporator and the crude methochloride melted over 360°. It was recrystallized from ethanol-ether and had an M.P. of over 360°.

(3) The allyl ammonium iodide was prepared as described in Example 1 by substituting allyl iodide for methyl iodide and had an M.P. of 193–194°.

(4) The ethyl ammonium iodide was prepared as described in Example 1 by substituting ethyl iodide for methyl iodide and had an M.P. of 248–250°.

(5) The dodecyl ammonium iodide was prepared as described in Example 1 by substituting dodecyl iodide for methyl iodide and had an M.P. of 249–250°.

(d) The hydrochloride was prepared as in Example 1 and had an M.P. of 232–233°.

Example 14

(a) Spiro-trans-decalin (2:4')-1'-methyl piperidine-2',6'-dione: The imide was prepared as in Example 1 from the anhydride of trans-beta-decalin-2,2-diacetic acid and an excess of methylamine and had a B.P. of 140–144° at 0.05 mm. and an M.P. of 93–94°.

(b) Spiro-trans-decalin (2:4')-1'-methyl piperidine: The title base was obtained as in Example 1 by reduction of the imide obtained in (a) above and had a B.P. of 153–156° at 10 mm.

(c) The methiodide was prepared as described in Example 1 and had an M.P. of 325–326°.

(d) The hydrochloride was prepared as in Example 1 and had an M.P. of 252–253°.

Example 15

(a) Spiro-trans-hexahydrohydrindene (2:4')-1'-methyl piperidine-2',6'-dione: The imide was prepared as in Example 1 from the anhydride of trans-hexahydrohydrindene-2,2-diacetic acid and an excess of methylamine and a B.P. of 124–129° at 0.1 mm.

(b) Spiro-trans-hexahydrohydrindene (2:4')-1'-methyl piperidine: The title base was obtained as in Example 1 by reduction of the imide obtained in (a) above and had a B.P. of 98–102° at 0.15 mm.

(c) The methiodide was prepared as in Example 1 and had an M.P. of 319–320°.

(d) The hydrochloride was prepared as in Example 1 and had an M.P. of 256–257°.

Example 16

(a) N-methyl-8-methyl-2-azaspiro (4:5) decane-1,3-dione: The imide was prepared as in Example 1 from the anhydride of 4-methylcyclohexane-1-carboxy-1-acetic acid and an excess of methylamine and had a B.P. of 81–84° at 0.2 mm.

(b) N-methyl-8-methyl-2-azaspiro (4:5) decane: The title base was prepared as in Example 1 by reduction of the imide obtained in (a) above and had a B.P. of 60–61° at 1.4 mm.

(c) The hydrochloride was prepared as in Example 1 and had an M.P. of 199–200°.

(d) The methiodide was prepared as in Example 1 and had an M.P. of 236–237°.

Example 17

(a) N - octadecyl - 2 - azaspiro (4:4) nonane - 1,3 - dione: The imide was prepared using the general procedure employed in Example 1 from the anhydride of cyclopentane-1-carboxy-1-acetic acid and an equivalent quantity of n-octadecylamine. The product had a boiling point of 203–206° at 0.18 mm.

(b) N-octadecyl-2-azaspiro (4:4) nonane: The title base was prepared by reduction of the imide from (a) above and had a boiling point of 178–182° at 0.17 mm.

(c) The methiodide was prepared as in Example 1 and had a melting point of 148–149°.

(d) The hydrochloride was prepared as in Example 1 and had a melting point of 217–218°.

*Example 18*

(a) N-(3-methoxypropyl)-3-azaspiro (5:5) undecane-2,4-dione: The imide was prepared using the general procedure employed in Example 1 from the anhydride of cyclohexane-1,1-diacetic acid and an equivalent amount of 3-methoxy propylamine. The product had a boiling point of 130–133° at 0.20 mm.

(b) N-(3-methoxypropyl)-3-azaspiro (5:5) undecane: The title base was prepared by reduction of the imide obtained in (a) above and had a boiling point of 105–107° at 0.4 mm.

(c) The methiodide was prepared as in Example 1 and had a melting point of 148–149°.

(d) The hydrochloride was prepared as in Example 1 and had a melting point of 247–249°.

*Example 19*

(a) N-methyl-9-t-butyl-3-azaspiro (5:5) undecane-2,4-dione: The imide was prepared using the general procedure employed in Example 1 from the anhydride of 4-t-butyl-cyclohexane-1,1-diacetic acid and an equivalent quantity of methylamine. The product was a solid having a melting point of 132–133°.

(b) N-methyl-9-t-butyl-3-azaspiro (5:5) undecane: The title base was prepared by reduction of the imide from (a) above and had a boiling point of 66–68° at 0.2 mm.

(c) The methiodide was prepared as in Example 1 and had a melting point of 339–340°.

(d) The hydrochloride was prepared as in Example 1 and had a melting point of 295–296°.

Still other compounds may be made within the general formulae set forth above, i.e., N-alkyl-3-azaspiro (14:5) eicosane, N-alkyl-3-azaspiro (23:5) octacosane, etc.

All temperatures used in this specification are degrees centigrade.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Non-toxic acid addition salts of the formula

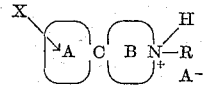

where A is selected from the group consisting of mono- and bicyclic carbon rings of at least 5 carbon atoms, X is at least one of the group consisting of hydrogen, alkyl and alkoxy, B is a saturated ring of 5 to 6 atoms one of which is nitrogen and the rest of which are carbon, the nitrogen atom being at least one carbon atom removed from the spiro carbon atom joining rings A and B, R is a member of the group consisting of alkyl and alkoxyalkyl of 1 to 22 carbon atoms, and A is a non-toxic anion.

2. Non-toxic quaternary salts of the formula

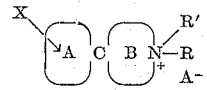

where A is selected from the group consisting of mono- and bicyclic carbon rings of at least 5 carbon atoms, X is at least one of the group consisting of hydrogen, alkyl and alkoxy, B is a saturated ring of 5 to 6 atoms one of which is nitrogen and the rest of which are carbon, the nitrogen atom being at least one carbon atom removed from the spiro carbon atom joining rings A and B, R is a member of the group consisting of alkyl and alkoxyalkyl of 1 to 22 carbon atoms, A is a non-toxic anion and R' is selected from the group consisting of alkyl and alkoxyalkyl of 1 to 22 carbon atoms.

3. N-methyl-3-azaspiro (5:5) undecane.
4. N-methyl-8-azaspiro (4:5) decane.
5. N-methyl-2-azaspiro (4:4) nonane.
6. N-methyl-3-azaspiro (5:6) dodecane.
7. N-methyl-2-methyl-8-azaspiro (4:5) decane.
8. Spiro-trans-decalin (2:4')-1'-methyl piperidine.
9. Spiro-trans-hexahydrohydrindene (2:4')-1'-methyl piperidine.

References Cited in the file of this patent

UNITED STATES PATENTS 3,016,552     Grogan et al. _____ Oct. 8, 1963

OTHER REFERENCES

Chemical Abstracts Subject Index, vol. 51: page 258s (1957).

Chemical Abstracts Subject Index, vol. 49; page 240s (1955).

Albertson: Journal of the American Chemical Society, vol. 74, pages 249–251 (1952).